United States Patent
Sarashetti (10) Patent No.: US 8,572,041 B2
(45) Date of Patent: Oct. 29, 2013

(54) REPRESENTING RECORDS (75) Inventor: Vijay V. Sarashetti, Helmetta, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2515 days.

(21) Appl. No.: 10/662,964

(22) Filed: Sep. 12, 2003

(65) Prior Publication Data

US 2005/0091195 A1  Apr. 28, 2005

(51) Int. Cl.
*G06F 7/00* (2006.01)

(52) U.S. Cl.
USPC ........................................................ 707/651

(58) Field of Classification Search
USPC .................................................... 707/3, 651
See application file for complete search history.

(56) References Cited

U.S. PATENT DOCUMENTS

| | | | | |
|---|---|---|---|---|
| 5,295,261 | A * | 3/1994 | Simonetti | 707/2 |
| 5,924,094 | A * | 7/1999 | Sutter | 707/10 |
| 5,946,681 | A * | 8/1999 | Shorter | 707/3 |
| 6,330,554 | B1 * | 12/2001 | Altschuler et al. | 706/21 |
| 7,120,596 | B2 * | 10/2006 | Hoffman et al. | 705/28 |
| 2002/0046131 | A1 * | 4/2002 | Boone et al. | 705/26 |
| 2002/0095308 | A1 * | 7/2002 | Pragelas et al. | 705/1 |
| 2002/0120627 | A1 * | 8/2002 | Mankoff | 707/10 |
| 2003/0030656 | A1 * | 2/2003 | Ang et al. | 345/700 |
| 2003/0033328 | A1 * | 2/2003 | Cha et al. | 707/204 |
| 2004/0030607 | A1 * | 2/2004 | Gibson | 705/26 |
| 2004/0117361 | A1 * | 6/2004 | Greer et al. | 707/3 |
| 2004/0198555 | A1 * | 10/2004 | Anderson et al. | 482/8 |

* cited by examiner

Primary Examiner — Truong Vo (57) ABSTRACT

A method for representing records includes, assigning a unique identifier to a record stored at a record collection site, entering the unique identifier in a hierarchical tree structure, and sending the hierarchical tree structure to a central storage site.

37 Claims, 6 Drawing Sheets

REPRESENTING RECORDS

BACKGROUND

This invention relates to representing records.

Data storage systems receive, store, and provide access to data with software applications such as database applications and the like. Some data storage systems are allowed only a limited amount of time for archiving records that include the data pertinent to a business enterprise. So not to interrupt the operations of the enterprise during normal business hours, record archiving is typically scheduled for over-night hours. During each archiving session, individual records are retrieved and entered into a single record list that is transmitted to a central storage site. The record list provides a listing of each record and can be searched to find a particular record. Along with being searchable, the record list can also be used to determine how recent an individual record was accessed along with how much storage space is currently being used and how much space is available based on current storage capabilities.

SUMMARY

According to an aspect of this invention, a method for representing records includes: assigning a unique identifier to a record stored at a record collection site, entering the unique identifier in a hierarchical tree structure, and sending the hierarchical tree structure to a central storage site.

According to a further aspect of the invention, a computer program product, tangibly embodied in an information carrier, for representing records, is operable to cause a machine to: assign a unique identifier to a record stored at a record collection site, enter the unique identifier in a hierarchical tree structure, send the hierarchical tree structure to the central storage site.

According to still a further aspect of the invention, a method for representing records includes, receiving a hierarchical tree structure at a central storage site from a record collection site, the hierarchical tree structure includes a unique identifier assigned to a record stored at the record collection site.

According to still a further aspect of the invention, a method for representing records includes, assigning a unique identifier to a record stored at a record collection site, entering the unique identifier in a hierarchical tree structure at the record collection site, sending the hierarchical tree structure to a central storage site, and using the unique identifier at the central storage site to access the record stored at the record collection site.

According to still a further aspect of the invention, a system includes, a record collection site that includes a computer system that assigns a unique identifier to a record stored at the record collection site and enters the unique identifier in a hierarchical tree structure, and a central storage site that receives the hierarchical tree structure from the record collection site.

One or more of the following features may also be included. The unique identifier may be used to produce an aggregate report, and the aggregate report may be sent to the central storage site. The unique identifier may be used at the central storage site to access the record stored at the record collection site. The unique identifier may include information representing a node located in the hierarchical tree structure. The node may be located in a higher position of the hierarchical tree structure than the unique identifier. Using the unique identifier to produce the aggregate report may include counting the unique identifier with a second unique identifier assigned to a second record stored at the record collection site. Using the unique identifier to produce an aggregate report may include summing data included in the record accessed by the unique identifier with data included in a second record accessed by a second unique identifier. A unique key that includes information representing a second node in the hierarchical tree structure may be assigned to the node.

One or more advantages may be provided from the invention. By assigning an identifier to each record and entering the identifier in a tree structure, the hierarchical nature of the tree structure causes the identifier to be stored with similar identifiers and provides relatively quick and logical access to the identifier for processing or for accessing the record associated with the identifier. Furthermore, the hierarchical tree structure can be transmitted to a central storage site for reporting the records collected and stored during a particular time period. By transmitting the tree structure, and not an exhaustive linear list that includes each record along with each record's content, portability is improved along with reducing the time needed to identify a particular record. Furthermore, by navigating through the tree structure relatively quickly to find an identifier, the time needed to access the associated record is reduced. Additionally, since tree structure is constructed of nodes, as different record categories are added or removed, the tree structure is capable of increasing or decreasing in size to represent the current record types. Furthermore, by assigning an identifying key to each node, similar to assigning an identifier to a record, upon receiving the identifying keys at a central storage site, a representation of the tree structure can be quickly assembled.

DETAILED DESCRIPTION

Figure 1:
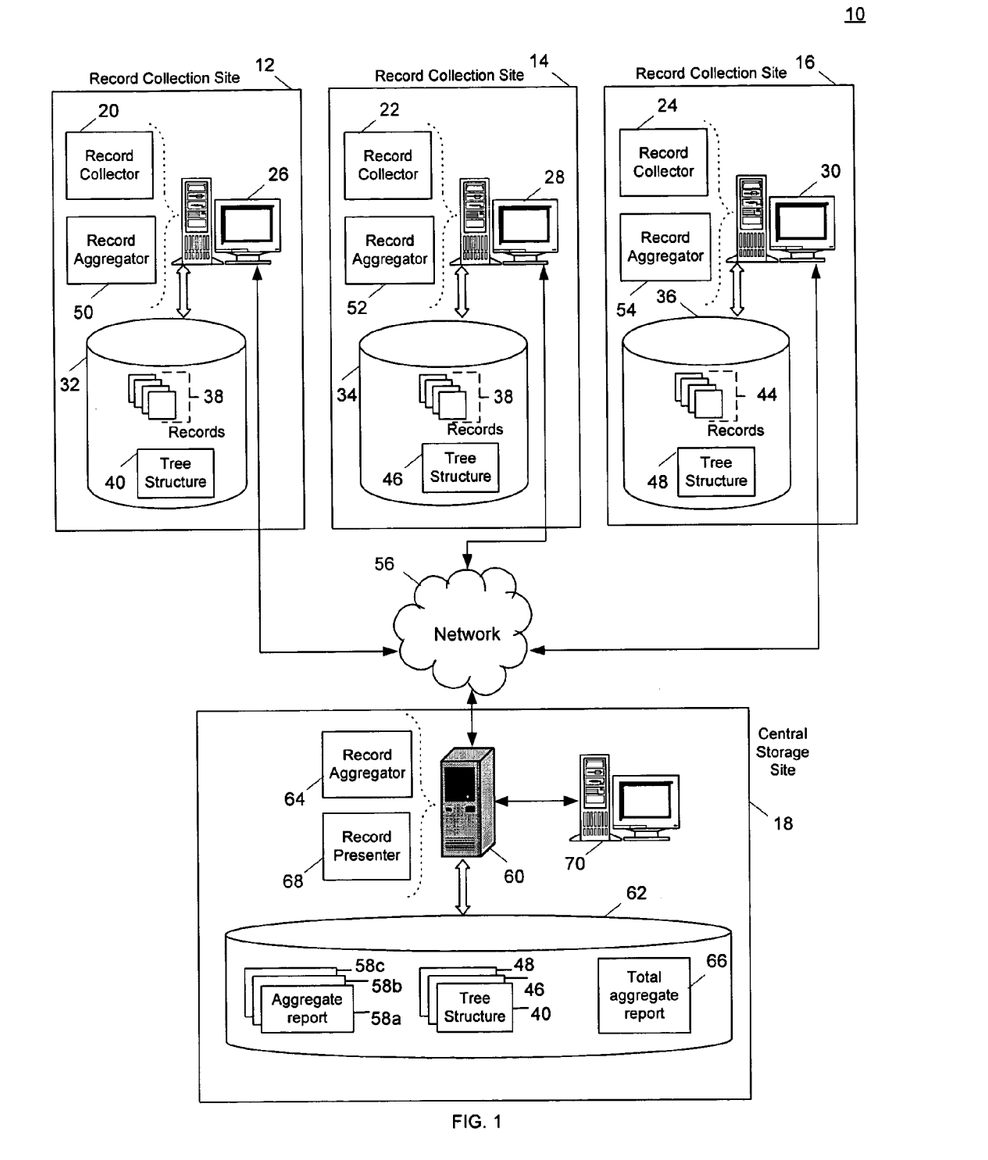
FIG. 1 is a block diagram depicting a system for storing records.

Referring to FIG. 1, a system 10 for collecting and storing records includes a group of record collection sites 12, 14, 16 that are remotely located. For example, each of the collection sites 12, 14, 16 are satellite offices of a brokerage house and each receives buy and sell orders from clients for stocks, bonds, and other types of securities. For instance, the central storage site tracks the buy and sell orders received at the collection sites 12, 14, 16. In another example, each of the collection sites 12, 14, 16 are stores of a retail store chain that sell merchandise and products to the general public. Upon completing a sale, a purchase record representing the sale is collected and stored at the respective collection site for reporting to a central storage site 18 that tracks, for example, the performance of the collection sites 12, 14, 16.

Using the example of the central storage site that tracks buy and sell orders, upon receiving an order to buy or sell a security at one of the collection sites 12, 14, 16, a respective record collector 20, 22, 24 executed on a computer system 26, 28, 30 produces a record that represents the transaction and respectively stores the record on a local storage device 32, 34, 36 (e.g., a hard drive, CD-ROM, etc.) that is in communication with the respective computer system 26, 28 or 30. By storing the record on the storage device, the record is archived and is capable of being used by other processes executed on the respective computer system 26, 28 or 30. For example, at the end of each trading session, records of similar transactions are counted to determine the total number of each transaction type completed at the collection site during the trading session. In another example, the stored records are used with other types of processing such as statistical processing to determine an average stock or bond buying or selling price.

Focusing on collection site 12, along with producing a record, the record collector 20 also produces and assigns a unique identifier to the record so that the record is distinguishable from other records 38 produced at the collection site, which are also each assigned unique identifiers and stored on the storage device 32. Additionally, the identifier assigned to the record is entered into a tree structure 40, which is also stored on the storage device 32, that includes identifiers assigned to the other records 38 produced by the record collector 20. Typically the tree structure is stored on the storage device 32 in a file, a table, or other similar data structure. Furthermore, in some arrangements the tree structure is produced with a database software package capable of storing data in a balanced tree structure such as the Berkeley DB Data Store™ (produced by Sleepycat Software of Lincoln, MA) that is herein incorporated by reference.

In addition to identifying and distinguishing the records 38, each identifier also includes information for accessing the record so that data can be retrieved from the stored record. By accessing a particular identifier in the tree structure 40, the location of the associated record on the storage device 32 is found. Furthermore, by storing identifiers into the tree structure 40, the identifiers assigned to similar record types are grouped together due to the hierarchical nature of the tree structure. For example, the identifiers assigned to records that represent stock buy orders are entered into the same particular location of the tree structure 40 while the identifiers assigned to records the represent stocks sell orders are entered into a different location of the tree structure. By grouping identifiers associated with similar record types into different locations in the tree structure 40, the identifiers are relatively quickly accessible. Correspondingly, since each identifier provides the location of the record to which it is assigned, each record is relatively quickly accessible based on the identifiers being grouped by similar type. By navigating through the tree structure 40, based on the hierarchical nature of the tree structure, to find a particular identifier, the record stored on the storage device 32 that is associated with the identifier is quickly identified and accessible to retrieve data included in the record. The tree structure can be transmitted to remote locations (e.g., the central storage site 18) to provide access to the records stored on the storage device 32 at the remote locations.

Similar to the records 38 stored on the storage device 32, records 42, 44 are produced at the record collection sites 14, 16 and respectively stored on storage devices 34 and 36. The records 42, 44 are produced by respective record collectors 22, 24 based on buy and sell orders received at the record collection site 14, 16. Also, the record collectors 22, 24 produce respective tree structures 46, 48 that include identifiers assigned to each record 42, 44 produced and stored at the respective collection sites 14, 16. After the records 38, 42, 44, and the corresponding tree structures 40, 46, 48 are produced and stored, the computer systems 26, 28, 30 can use the identifiers to provide the central storage site 18 with a consolidated report of the records collected. For example, at the end of a particular time period (e.g., trading session, end of a business day, etc.), each of the record collection sites process the respective identifiers associated with security orders stored at the site to produce and send a consolidated report to the central storage site 18. Additionally, the identifiers may be used to access associated records for data and other record content.

Continuing with the above example, at the end of a trading session each computer system 26, 28, 30 executes a respective record aggregator 50, 52, 54 that uses the respective tree structures 40, 46, 48 to access and process identifiers and records stored at the record collection sites 12, 14, 16. In particular, focusing on record collection site 12, the record aggregator 50 executing on computer system 26 uses the tree structure 40 to access the records 38 stored on the storage device 32. In this arrangement, each of the record aggregators 50, 52, 54 count the number of identifiers included in the respective tree structures 40, 46, 48 that were grouped together based on the record type. The record aggregator 50 accesses the tree structure 40 and counts the identifiers associated with each record type (e.g., stock buy order, stock sell order, bond buy order, bond sell order, etc.) included in the tree structure. While this particular example uses records based on securities transactions, in other arrangements the tree structures 40, 46, 48 include records types associated with other types of business enterprises. For example each tree structure 40, 46, 48 may include record types for different products or services provided by a retail store.

In this arrangement, after the record aggregator 50 has counted the identifiers associated with each of the different record types, an aggregate report 58a is produced to include the counts of the different types of identifiers. Once produced, the aggregate report 58a is sent through a network 56 (e.g., the Internet, an Intranet, combination of networks, etc.) to a server 60 located at the central storage site 18. Similarly the record aggregators 52, 54 executing at the other record collection sites 14, 16 produce corresponding aggregate reports 58b, 58c that include counts of the different types of identifiers stored in the respective tree structures 46, 48. The reports are transmitted to the central storage site 18. Typically, the aggregate reports 58a-c are stored on a storage device 62 (e.g., a hard drive, CD-ROM, etc.) that is in communication with the server 60. The aggregate reports 58a-c may be a text file, binary file, database, or other similar type of data file.

By sending each of the aggregate reports 58a-c to the central storage site 18, a condensed list is received from each of the record collection sites 12, 14, 16 that provides a numerical tally of each record type collected during the time period of time rather than receiving a larger list that includes each record collected during the time period along with each record's content. Also, by transmitting the aggregate reports 58a-c bandwidth associated with the network 56 is conserved along with transmission time. In some arrangements, the collection sites 12, 14, 16 are only allowed a finite time period to report the records collected during the business day, so by reducing data transmission time, additional time is conserved for executing other processes at the collection sites 12, 14, 16 or at the central storage site 18. For example, the record collection sites 12, 14, 16 may only be allowed to transmit to the central storage site 18 during the night (e.g., 11 p.m. to 5 a.m.) for archiving the records collected. If, for example, 100 million records were collected among the collection sites, which is roughly equivalent to collecting 10 tera-bytes of data, more than six hours may be needed to transmit a list of the records and the records' content collected from each of the record collection sites to the central storage site. By transmitting the aggregate reports 58a-c, which typically have a smaller size than a list that includes every record collected, the transmission time is reduced providing extra time to transmit additional data between the collection sites 12, 14, 16 and the central storage site 18. The server 60 at the central storage site 18 can sum the data included in the received aggregate reports 58*a-c* and transmit the corresponding total to each of the record collection sites for comparing record collections among the sites.

In some arrangements, each of the collection sites 12, 14, 16 also respectively transmits the tree structures 40, 46, 48 produced by the respective record collectors 20, 22, 24 to the central storage site 18. In this particular example, the tree structures 40, 46, 48 are received by the server 60 and stored on the storage device 62. By transmitting the tree structures 40, 46, 48 from the respective record collection sites 12, 14, 16, the central storage site 18 is capable of using the identifiers included in each tree structure. Upon receiving the tree structures 40, 46, 48, one or more processes executing on the server 60 can sort, filter, or perform other similar operations using the identifiers included in the tree structures. In this particular example, a record aggregator 64 executing on the server 60 sums the counts of the different record types from each of the collection sites 12, 14, 16 as provided by the aggregate reports 58*a-c*. By summing the counts of the similar record types from each collection site, the record aggregator 64 provides the central storage site 18 with a total count of each record type collected during the collection time period (e.g., a trading session) from all of the collection sites. For example, by summing the number of bond sell orders from each of the aggregate reports 58*a-c*, the aggregator process 64 determines the total number of bonds sold across all of the collection sites 12, 14, 16. Similarly, the total number of bond buy orders, stock buy orders, etc. across all of the collection sites are capable of being determined by the record aggregator 64. In other arrangements, the tree structures 40, 46, 48 sent from the collection sites are used by the record aggregator 64 to determine, for example, the total number of products sold at all of the collection sites along with determining the distribution of total product sold across a particular product line at each collection site.

Additionally, by transmitting each of the tree structures 40, 46, 48 from the collection sites, the central storage site 18 can use one or more of the identifiers included in the tree structures to access the individual records that are stored at the individual collection sites. For example, the server 60 can use the tree structure 40 sent from record collection site 12 to individually access the records 38 stored at the collection site 12. By accessing the individual records at the collection site 12, the server 60 can retrieve data that is included in the stored record but that was not included in the aggregate report 58*a* sent to the central storage site 18. In one particular example the server 60 may use an identifier included in the tree structure 40 to provide a pathway to the associated record to retrieve data that represents the identity of the person that placed a particular bond buy order. Also, by providing the server 60 the ability to access the individual records, the records stored at the collection sites and do not need to be transmitted to the central storage site for archiving. By storing the records at the particular site where they were collected, or an associated site, storage space is conserved at the central storage site 18 along with the bandwidth needed to transmit the records from the collection sites 12, 14, 16 to the central storage site.

In this particular example, after the record aggregator 64 sums the data included in the aggregate reports 58*a-c*, results are entered into a total aggregate report 66 that is produced by the record aggregator and stored on the storage device 62. However, in some arrangements the total aggregate report 66 is stored separate from the aggregate reports 58*a-c* and the tree structures 40, 46, 48. The server 60 executes a record presenter 68 that formats the data included in the aggregate records 58*a-c* along with data of the total aggregate record 66 for displaying on a computer system 70 located at the central storage site 18 and is in communication with the server 60. By presenting this information, for example in a graphic user interface (GUI), personnel at the central storage site 18 can study the total number of orders received by the collection sites 12, 14, 16 along with how the received orders are distributed across the collection sites. Additionally, in some arrangements the record presenter 68 initiates a transmission of the total aggregate report 66 to each of the collection sites 12, 14, 16 so that personnel at each collection site are provided with the total number of orders received from each site for comparisons. Additionally in some arrangements record presenter 68 initiates transmissions of each of the tree structures 58*a-c* to each of the collection sites 12, 14, 16 so that individual records are accessible from any of the collection sites regardless of which collection site stores the record.

Figure 2:
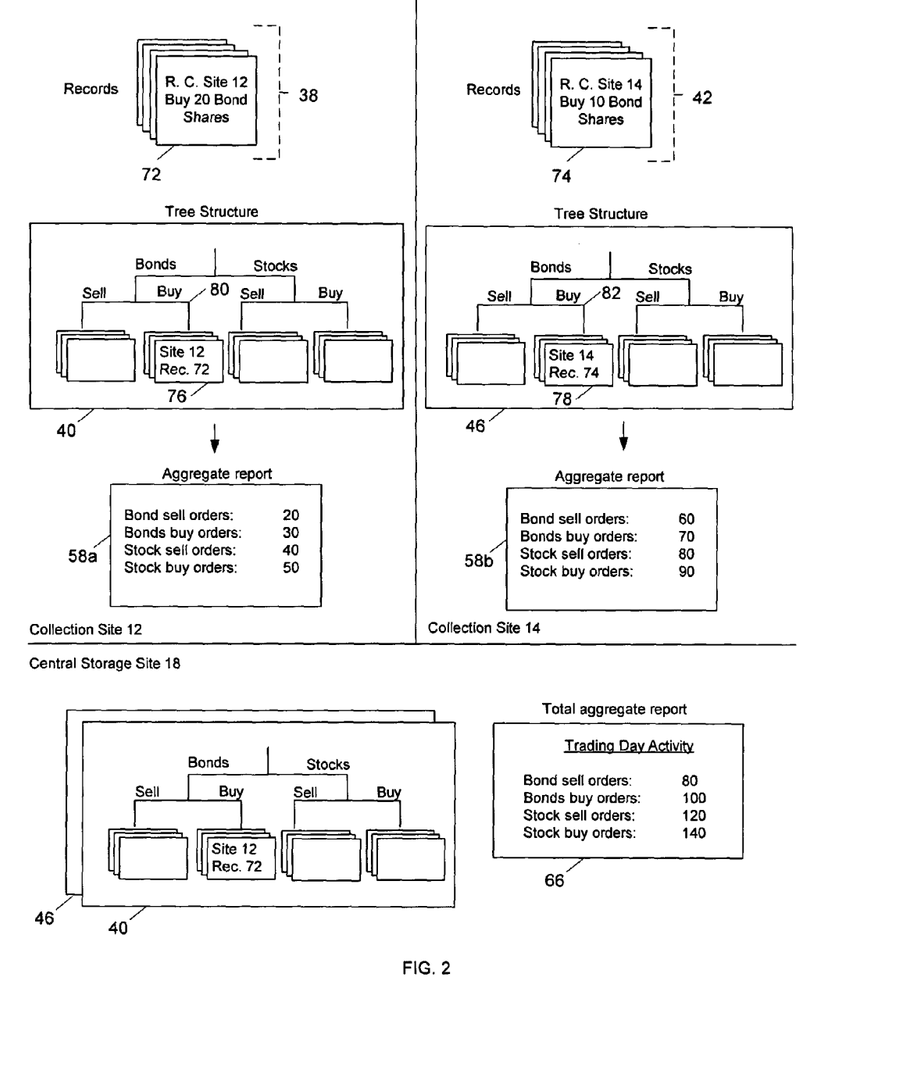
FIG. 2 is a block diagram depicting records being associated with tree structures that are transmitted to a central storage site.

Referring to FIG. 2, the records 38, 42 collected at record collection sites 12 and 14, are shown. As mentioned, as each record is collected at each record collection site, an identifier is assigned to the record. The identifier is placed in the respective tree structure associated with the collection site. In this example, record 72 is produced at collection site 12 and corresponds to a bond buy order for 20 shares and record 74 is produced at collection site 14 and corresponds to a bond buy order for 10 bond shares. Correspondingly, upon producing each of the records 72, 74 the respective record collectors 20, 22 produce identifiers 76, 78 that are assigned to the respective records and placed in the respective tree structures 40, 46 associated with each record collection site 12, 14. In this example the identifiers 76, 78 are respectively entered into nodes 80, 82 in the tree structures 40, 46 that are associated with bond buy orders. As additional orders are received, each of the record collectors 20, 22 continues to produce identifiers that are assigned to the corresponding records and enter the identifiers in the respective tree structures 40, 46 stored at the collection sites 12, 14. At the end of a predetermined period of time (e.g., end of a business day, end of a trading session, etc.) order collection halts and each of the record collectors 40, 46 stops producing records for received orders and the record aggregators 50, 52 respectively count the number of identifiers for each record type. In some arrangements the record aggregators 50, 52 use one or more of the identifiers to access corresponding records for data stored in the record. The individual records may be accessed to determine the number of bond or stock shares bought or sold during the trading session.

Once each of the record aggregators 20, 22 counts the number of identifiers associated with each record type, the count is entered into the respective aggregate report 58*a*, 58*b* that is produced and stored on the respective storage device 32, 34. In this particular example each of the aggregate reports 58*a*, 58*b* include the number of bond sell orders received, bond buy orders received, stock buy orders received, and stock sell orders received at the respective record collection sites 12, 14. After each of the aggregate reports 58*a*, 58*b* are produced, they are transmitted to the central storage site 18 along with the tree structures 40, 46. In some arrangements, data included in the aggregate reports 58*a*, 58*b* are displayed on the computer systems 26, 30 so that personnel located at each respective collection site 12, 14 can study the number of order types received.

Upon receiving the tree structures 40, 46 and the aggregate reports 58*a*, 58*b*, the record aggregator 64 executing on the server 60 at the central storage site 18 uses the aggregate reports to determine a total count of each record type. In this particular example, the record aggregator 64 produces the total aggregate report 66 that includes the respective sums of the counts included in each of the aggregate reports 58*a*, 58*b*. For example, the total aggregate report 66 includes eighty bond sell orders (i.e., 20 bond sell orders from collection site 12 +60 bond sell orders from collection site 14), one hundred bond buy orders (i.e., 30 bond buy orders from collection site 12+70 bond buy orders from collection site 14), one hundred twenty stock sell orders (i.e., 40 stock sell orders from collection site 12+80 bond buy orders from collection site 14), and one hundred forty stock buy orders (i.e., 50 stock buy orders from collection site 12+90 stock buy orders from collection site 14). The total aggregate report 66 is stored at the central storage site 18 and can be transmitted to each record collection sites for dissemination. The tree structures 40, 46 from the record collection sites 12, 14 are stored at the central storage site 18 to provide access to the individual records that are stored at the collection sites. Furthermore, in some arrangements the tree structures associated with a particular trading day, or other similar time period are stored together in a group to provide ease in accessing individual records from a particular time period.

Figure 3:
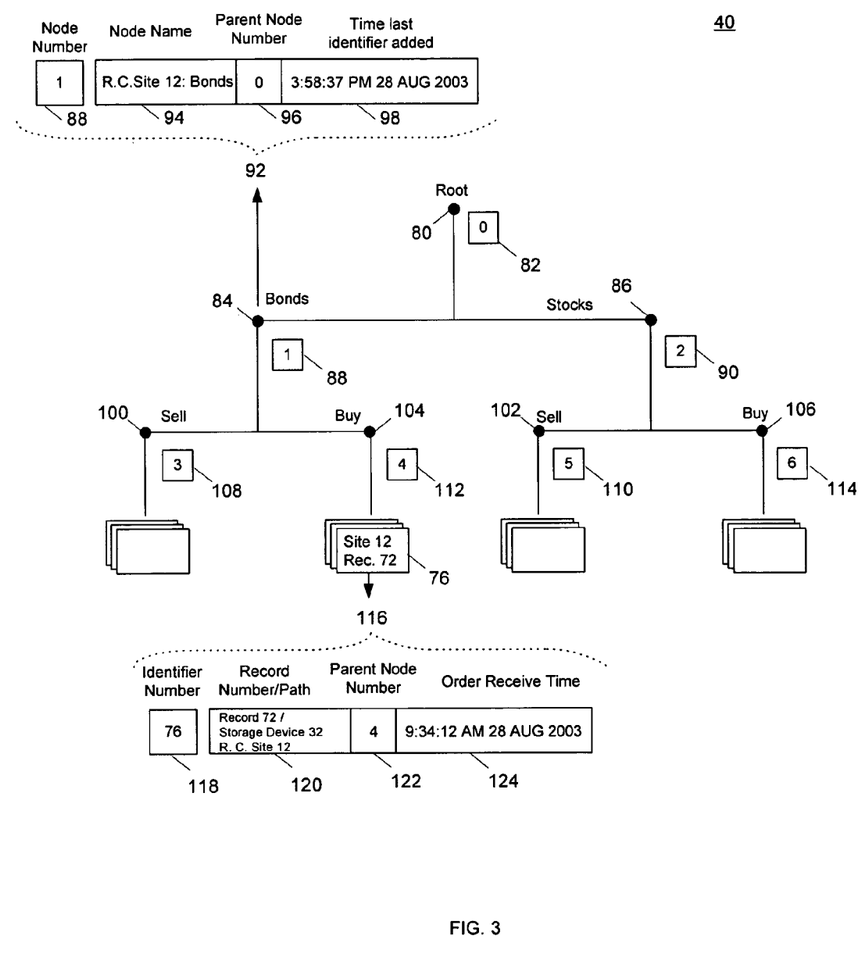
FIG. 3 is a block diagram depicting a tree structure.

Referring to FIG. 3, the tree structure 40 produced at collection site 12 and sent to the central storage site 18 includes a number of branches connected by nodes that provide a hierarchy for separating identifiers into appropriate categories. In this example, from top to bottom, the tree structure 40 includes a root node 80 that is assigned a root number "0" 82 to indicate it as the first node in the tree structure. The tree structure splits between two nodes 84, 86 to separate identifiers assigned to bond orders from identifiers assigned to stock orders. In this example the node 84 is associated with bond orders is assigned a node number "1" 88 and the node 86 is associated with stock orders is assigned a node number "2" 90, however, in other arrangements other node numbering systems are used to distinguish the nodes.

Along with using node numbers to distinguish the different nodes, each node is also assigned a unique key that includes data that is uniquely associated with node. For example, referring to the bonds node 84 (i.e., node number 1), an assigned key 92 includes the node number 88 and a series of additional information for distinguishing the node and to provide information associated with the node. In this arrangement, the additional information includes a field 94 that represents the name of the node and the particular record collection site associated with the node (e.g., Record collection site 12: Bonds). The additional information also includes a parent node number 96 that identifies the particular node that resides directly above node 84 in the hierarchy of the tree structure 40. In this example, the root node 80 resides above the bonds node 84. Since the root node has been assigned the node number "0" 82, that particular number is included as the parent node number 96 in the key 92. The tree structure is relatively quickly assembled at the central storage site 18 by using the parent node numbers in combination with the node numbers, which are both received in the respective keys.

In this particular arrangement, the key 92 also includes a field 98 that identifies the time and date when the last identifier was entered into the bonds portion of the tree structure 40. The last identifier associated with a bond transaction was entered into the tree structure 40 at 3:58:37 p.m. on Aug. 28, 2003. By providing this time and date stamp, the central storage site 18 can compare keys assigned to different nodes to determined which category in the tree structure had the most recent addition. While this particular example includes a time and date stamp in the key 92, in other arrangements, other attributes associated with each node are included in the key along with, or not, the time and date stamp. For example, attributes assigned to each node may include the node number(s) assigned to node(s) directly below in the tree structure, the total number of identifiers assigned within that portion of the tree structure associated with the node (e.g., 180 bond transactions, etc), or other similar attributes. Furthermore, in some arrangements, each attribute included in the key 92 has the same data length (e.g., 8 bytes) or variable lengths. Additionally, in some examples the key 92 includes data that indicates the length of each included attribute.

In the tree structure 40, both the bond node 84 and the stock node 86 are respective parent nodes of sell nodes 100, 102 and buy nodes 104, 106. In this example the sell nodes 100, 102 are respectively assigned node numbers "3" 108 and "5" 110 and the buy nodes 104, 106 are respectively assigned node numbers "4" 112 and "6" 114. Similar to the bonds node 84, each of the nodes 100-106 are assigned a key that includes similar information. In this particular arrangement the nodes 100-106 reside at the bottom the tree structure 40 and are associated with the appropriate individual identifiers that are entered into the tree structure. Identifiers associated with bond sell orders are assigned to the node 100 assigned with node number "3" and identifiers associated with bond buy orders are assigned to the node 104 assigned node number "4". By separating the entered identifiers based on the nodes of the tree structure 40, the computer system 26 at the record collection site 12 and the server 60 at the storage collection site 18 can quickly search through the tree structure for an identifier associated with a particular transaction (e.g., a bond sell order). Upon finding a particular identifier, information included in the identifier allows the central storage site 18, the record collection site 12, or any other location with a copy of the tree structure to locate and access the record associated with the identifier.

In this particular arrangement, identifiers associated with the nodes 100-106 at the bottom level of the tree structure 40 each include information that distinguishes each identifier and provides the location of the record to which the identifier is assigned. For example, identifier 76 is associated with a bond buy order and is correspondingly assigned to the node 104. Similar to the nodes, each identifier such as the identifier 76 also includes a key that includes information associated with the tree structure 40 and the record to which the identifier was assigned. In this particular example, the identifier 76 includes a key 116 that includes a unique number 118 assigned to the identifier. The key 116 also includes the record number/path 120 that includes the record number to which the identifier was assigned (e.g., record 72) and a file system pathway to assist the central storage site 18, or other site, in accessing the associated record. In this particular example, the record number/path 120 provides that the record 72 is stored on the storage device 32 located in the record collection site 12.

Similar to the keys assigned to each node, in some arrangements the key 116 for the identifier 76 also includes a node number 122 of the parent node that resides in the tree structure directly above the identifier. The key 116 includes the parent node number 4 to identify that node 104 is located above the identifier 76. Also, the key 116 includes one or more attributes associated with the identifier or the record to which it is assigned. A field 124 provides the day and time that the order was received at the record collection site 12. However, similar to the key 92 associated with node 84, in some arrangements the key 116 is capable of storing two or more other attribute fields with fixed or variable lengths along with data that provides information providing the length of each attribute field in bytes.

Figure 4:
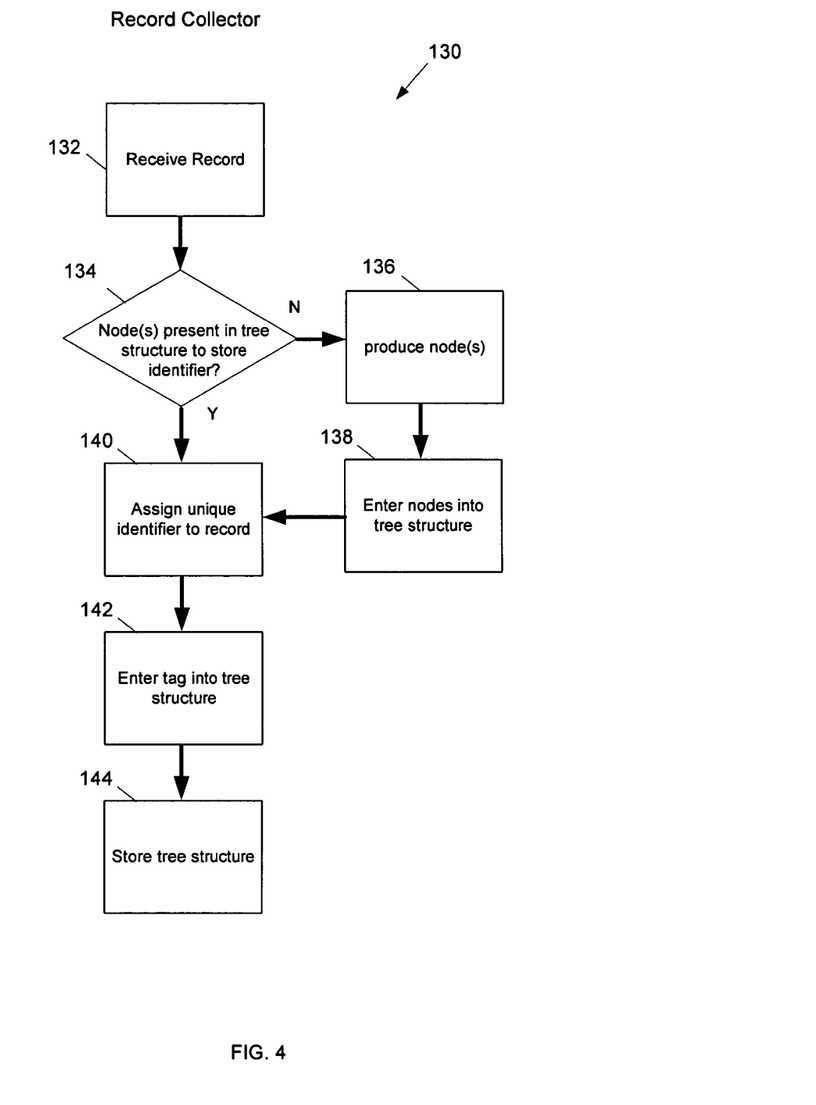
FIG. 4 is a flow chart of a record collector.

Referring to FIG. 4, a portion of a record collector 130 such as the record collector 20 includes receiving 132 a record that includes data representing a bond or stock transaction (e.g., buy order, sell order, etc.). After receiving 132 the record, the record collector 130 determines 134 if the appropriate one or more nodes are present in a tree structure, such as tree structure 40. If the record collector 130 determined that the appropriate one or more nodes are not present in tree structure, the record collector 130 produces 136 the one or more nodes. Typically, while producing the one or more nodes, the record collector 130 assigns a unique key for each node produced, such as the key 92, to distinguish each node and for assembling the tree structure from the keys. After the one or mode nodes are produced 136, the record collector 130 enters 138 the one or more nodes into the tree structure. If the record collector 130 determined that the appropriate one or more nodes are present in the tree structure, or after the appropriate nodes are produced and entered into the tree structure, the record collector 130 assigns 140 a unique identifier to the record, such as the unique identifier 76 assigned to record 72 (shown in FIG. 2). After the identifier is assigned 140 to the record, the record collector 130 enters 142 the identifier into the tree structure and stores 144 the tree structure on a storage device such as storage device 32.

Figure 5:
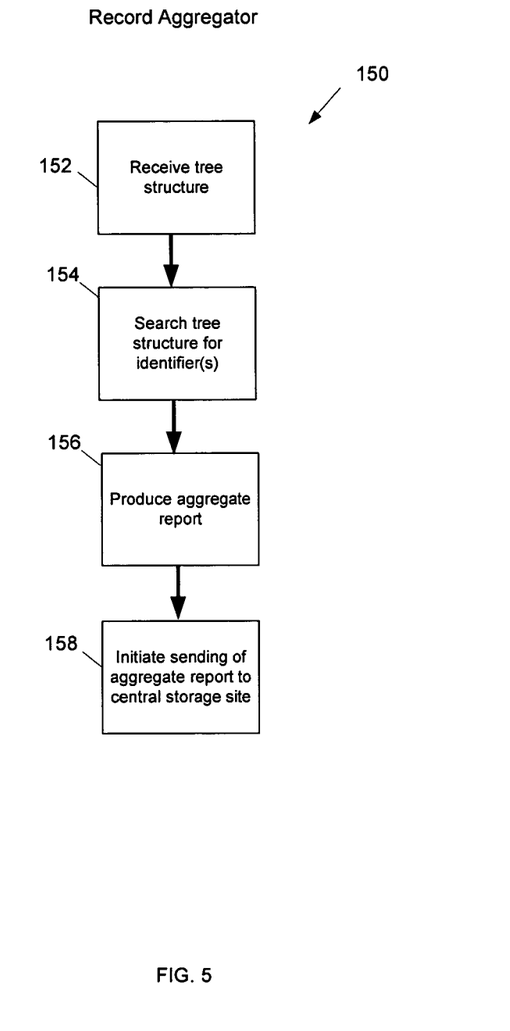
FIG. 5 is a flow chart of a record aggregator.

Referring to FIG. 5, a portion of a record aggregator 150, such as the record aggregator 50 receives 152 a tree structure. Typically, the tree structure is retrieved from a storage device such as the storage device 32 at the collection site 12. After receiving the tree structure, the record aggregator 150 searches 154 the tree structure for one or more identifiers included in the tree structure for processing. In one example, the record aggregator searches for identifiers associated with a particular type of record (e.g., bond buy orders, etc.) to determine the number of records collected of that particular type. In some arrangements, after searching for the one or more identifiers, the record collector uses the identifiers to retrieve the respective records associated with the identifiers. The record collector uses identifiers to access data stored in respective records for processing such as e.g., summing the number of bond shares sold during a trading session. In another example, the record collector uses the identifiers (e.g., for counting) and does not retrieve the records associated with the identifiers. After searching 154 the tree structure and using the identifiers or the respective records, the record collector 150 produces 156 an aggregate report that includes data representing the number of identifiers for each record type represented in the tree structure. After the aggregate report is produced, the record collector 150 initiates 158 the transmission of the aggregate report to the central storage site 18 or other sites. In some arrangements, the record collector also initiates the transmission of the tree structure to the central storage site or other remote sites.

Figure 6:
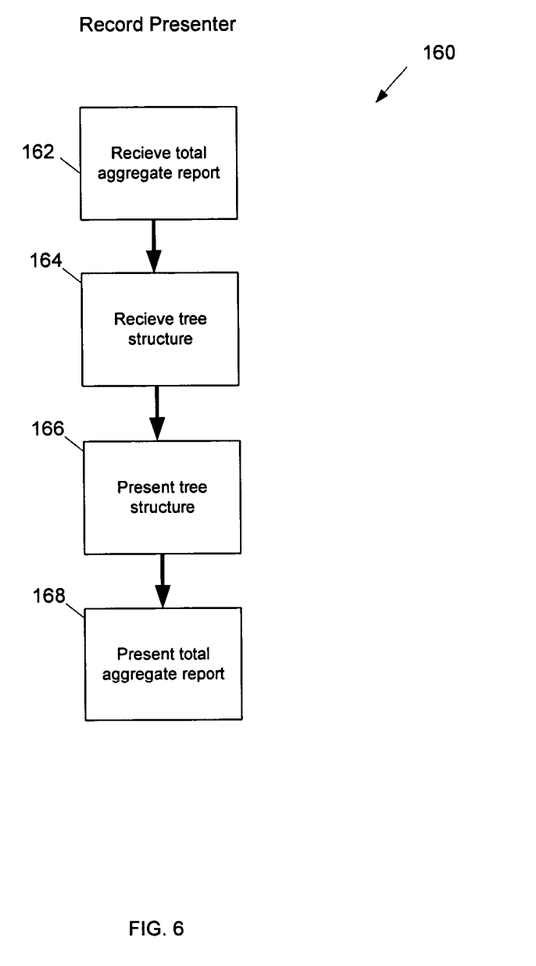
FIG. 6 is a flow chart of a record presenter.

Referring to FIG. 6, a portion of a record presenter 160, such as the record presenter 68 that executes on the server 60 at the central storage site 18 includes receiving a total aggregate report. For example, in some arrangements the total aggregate report is produced from aggregate reports that are received at the central storage site 18 from each of the record collection sites 12, 14, 16. Additionally, in some arrangements the total aggregate report was previously produced, stored on a storage device, and retrieved from the storage device by the record presenter at an appropriate time. In some arrangements the record presenter 160 also receives 164 one or more tree structures from the record collection sites that are typically stored on a storage device at the central storage site 18. After receiving the total aggregate report and the tree structures, the record presenter 160 displays 166 the received tree structures and displays 168 the total aggregate report, for example, on the computer system 70 that is in communication with the server 60 and is located at the central storage site 18 to provide personnel a consolidated report of the transactions received at each of the record collection sites 12, 14, 16.

The processes described above can be implemented in digital electronic circuitry, or in computer hardware, firmware, software, or in combinations of them. The processes described herein can be implemented as a computer program product, i.e., a computer program tangibly embodied in an information carrier, e.g., in a machine-readable storage device, for execution by, or to control the operation of, data processing apparatus, e.g., a processing device, a computer, or multiple computers. A computer program can be written in any form of programming language, including compiled, assembled, or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Particular embodiments have been described, however other embodiments are within the scope of the following claims. For example, the operations of each process can be performed in a different order and still achieve desirable results.

What is claimed is:

1. A computer implemented method for representing records, the method comprising:
   receiving an order for a transaction at a record collection site;
   producing a record that represents the transaction at the record collection site;
   storing the record in a memory location in a computer readable storage medium at the record collection site;
   assigning a unique identifier to the record stored at the record collection site;
   entering the unique identifier in a hierarchical tree structure stored in a computer readable storage medium at the record collection site, wherein the unique identifier comprises information for accessing the record in the memory location, and wherein the tree structure comprises a plurality of branches connected by nodes; and
   sending the hierarchical tree structure to a central storage site that is separate from the record collection site; and
   receiving requests from the central storage cite to access records at the record collection site in accordance with the hierarchical tree structure sent to the central storage site.

2. The method of claim 1 further comprising:
   using the unique identifier to produce an aggregate report of records collected by the record collection site; and
   sending the aggregate report to the central storage site.

3. The method of claim 2, wherein using the unique identifier to produce the aggregate report includes counting the unique identifier with a second unique identifier assigned to a second record stored at the record collection site.

4. The method of claim 2, wherein using the unique identifier to produce an aggregate report includes summing data included in the record accessed by the unique identifier with data included in a second record accessed by a second unique identifier.

5. The method of claim 1 further comprising:
using the unique identifier at the central storage site to access the record stored at the record collection site.

6. The method of claim 1, wherein the unique identifier includes information representing a node located in the hierarchical tree structure.

7. The method of claim 6, wherein the node is located in a higher position of the hierarchical tree structure than the unique identifier.

8. The method of claim 6, wherein a unique key that includes information representing a second node in the hierarchical tree structure is assigned to the node.

9. The method of claim 1, wherein assigning a unique identifier to a record stored at a record collection site comprises:
producing a record at the record collection site;
producing a unique identifier for the record to allow the record to be identified, distinguished and accessed from the record collection site;
assigning a unique identifier to the record so that the record is distinguishable from other records produced at the record collection site; and
entering the unique identifier assigned to the record into a tree structure which is also stored at the record collection site.

10. The method of claim 9, wherein tree structure identifiers are assigned to similar record types and are grouped together thereby improving accessibility for the stored records.

11. The method of claim 10, wherein the tree structure is produced with a database software package capable of storing data in a balanced tree structure.

12. A computer program product, recorded in a non-transitory computer-readable storage medium; comprising logic instructions which, when executed on a processor, cause the processor to:
collect orders for a plurality of transactions at a record collection site;
produce a record for each of the transactions at the record collection site;
store the records in a memory location at the record collection site;
assign a unique identifier to each of said records stored at the record collection site;
enter the unique identifiers in a hierarchical tree structure stored at the record collection site, wherein each unique identifier comprises information for accessing a corresponding record in the memory location, and wherein the tree structure comprises a plurality of branches connected by nodes; and
send an aggregate report of record type counts at the record collection site based on the unique identifiers in the hierarchical tree structure, the aggregate report being sent to a central storage site that is separate from the record collection site.

13. The computer program product of claim 12, further comprising logic instructions recorded on the computer readable storage medium which, when executed on the processor, cause the processor to:
use the unique identifier to produce an aggregate report of records collected by the record collection site; and
send the aggregate report to a central storage site.

14. The computer program product of claim 13, further comprising logic instructions recorded on the computer readable storage medium which, when executed on the processor, cause the processor to count the unique identifier with a second unique identifier assigned to a second record stored in at the record collection site.

15. The computer program product of claim 13, further comprising logic instructions which, when executed on the processor, cause the processor to sum data included in the record accessed by the unique identifier with data included in a second record accessed by a second unique identifier.

16. The computer program product of claim 12, further comprising logic instructions recorded on the computer readable storage medium which, when executed on the processor, cause the processor to:
use the unique identifier at the central storage site to access the record stored at the record collection site.

17. The computer program product of claim 12, wherein the unique identifier includes information representing a node located in the hierarchical tree structure.

18. The computer program product of claim 17, wherein the node is located in a higher position of the hierarchical tree structure than the unique identifier.

19. The computer program product of claim 17, wherein a unique key that includes information representing a second node in the hierarchical tree structure is assigned to the node.

20. The computer program product of claim 12, further comprising logic instructions recorded on the computer readable storage medium which, when executed on the processor, cause the processor to:
produce a record at the record collection site;
produce a unique identifier for the record to allow the record to be identified, distinguished and accessed from the record collection site;
assign a unique identifier to the record so that the record is distinguishable from other records produced at the record collection site; and
enter the unique identifier assigned to the record into a tree structure which is also stored at the record collection site.

21. The computer program product of claim 20, wherein tree structure identifiers are assigned to similar record types and are grouped together thereby improving accessibility for the stored records.

22. The computer program product of claim 21, wherein the tree structure is produced with a database software package capable of storing data in a balanced tree structure.

23. A computer implemented method for representing records, the method comprising:
receiving an order for a transaction at a record collection site;
producing a record that represents the transaction at the record collection site;
storing the record in a computer readable storage medium in a memory location at the record collection site;
assigning a unique identifier to the record stored at the record collection site;
entering the unique identifier in a hierarchical tree structure stored in a computer readable storage medium at the record collection site, wherein the unique identifier comprises information for accessing the record in the memory location, and wherein the tree structure comprises a plurality of branches connected by nodes;
sending the hierarchical tree structure to a central storage site that is separate from the record collection site;
receiving requests from the central storage cite to access records at the record collection site in accordance with the hierarchical tree structure sent to the central storage site; and using the unique identifier to access the record stored at the record collection site.

24. The method of claim 23 further comprising: receiving an aggregate report at the central storage site produced at the record collection site using the unique identifier.

25. The method of claim 23, wherein the unique identifier includes information representing a node located in the hierarchical tree structure.

26. The method of claim 23, wherein assigning a unique identifier to a record stored at a record collection site comprises:
producing a record at the record collection site;
producing a unique identifier for the record to allow the record to be identified, distinguished and accessed from the record collection site;
assigning a unique identifier to the record so that the record is distinguishable from other records produced at the record collection site; and
entering the unique identifier assigned to the record into a tree structure which is also stored at the record collection site.

27. The method of claim 26, wherein tree structure identifiers are assigned to similar record types and are grouped together thereby improving accessibility for the stored records.

28. The method of claim 27, wherein the tree structure is produced with a database software package capable of storing data in a balanced tree structure.

29. A computer implemented method for representing records, the method comprising:
receiving an order for a transaction at a record collection site;
producing a record that represents the transaction at the record collection site;
storing the record in a computer readable storage medium in a memory location at the record collection site;
assigning a unique identifier to the record stored at the record collection site;
entering the unique identifier in a hierarchical tree structure in a computer readable storage medium at the record collection site, wherein the unique identifier comprises information for accessing the record in the memory location, and wherein the tree structure comprises a plurality of branches connected by nodes; and
sending the hierarchical tree structure to a central storage site that is separate from the record collection site to enable the central storage site to access the record corresponding to the unique identifier in the hierarchical tree structure.

30. The method of claim 29, wherein the unique identifier at the record collection site is used to produce an aggregate report that is sent to the central storage site.

31. The method of claim 29, wherein the unique identifier includes information representing a node located in the hierarchical tree structure.

32. A system comprising:
a record collection site that includes a computer system comprising logic instructions recorded on a computer readable storage medium which, when executed on computer system, cause the computer system to assign a unique identifier to a record stored at the record collection site and enter the unique identifier in a hierarchical tree structure; and
a central storage site remote from the record collection site, the central storage site includes a computer system comprising logic instructions recorded on a computer readable storage medium which, when executed on computer system, cause the computer system to receive the hierarchical tree structure from the record collection site and to selectively access the record being stored in the record collection site using the unique identifier.

33. The system of claim 32, wherein the computer system at the record collection site further comprises logic instructions recorded on a computer readable storage medium which, when executed on computer system, cause the computer system to use the unique identifier to produce an aggregate report and initiate transmission of the aggregate report to the central storage site.

34. The system of claim 32, wherein the unique identifier includes information representing a node located in the hierarchical tree structure.

35. The system of claim 32, wherein a record collection site that includes a computer system that further comprises logic instructions recorded on a computer readable storage medium which, when executed on computer system, cause the computer system to:
produce a record at the record collection site;
produce a unique identifier for the record to allow the record to be identified, distinguished and accessed from the record collection site;
assign a unique identifier to the record so that the record is distinguishable from other records produced at the record collection site; and
enter the unique identifier assigned to the record into a tree structure which is also stored at the record collection site.

36. The method of claim 35, wherein tree structure identifiers are assigned to similar record types and are grouped together thereby improving accessibility for the stored records.

37. The method of claim 36, wherein the tree structure is produced with a database software package capable of storing data in a balanced tree structure.

* * * * *

UNITED STATES PATENT AND TRADEMARK OFFICE
CERTIFICATE OF CORRECTION

| | |
|---|---|
| PATENT NO. | : 8,572,041 B2 |
| APPLICATION NO. | : 10/662964 |
| DATED | : October 29, 2013 |
| INVENTOR(S) | : Vijay V. Sarashetti |

Page 1 of 1

It is certified that error appears in the above-identified patent and that said Letters Patent is hereby corrected as shown below:

In the Claims:

In column 11, line 36, in Claim 12, delete "medium;" and insert -- medium --, therefor.

Signed and Sealed this
Eleventh Day of February, 2014

Michelle K. Lee
*Deputy Director of the United States Patent and Trademark Office*